F. ROUSH.
GRASS CATCHER FOR LAWN MOWERS.
APPLICATION FILED SEPT. 23, 1907.
934,361.
Patented Sept. 14, 1909.
2 SHEETS—SHEET 1.
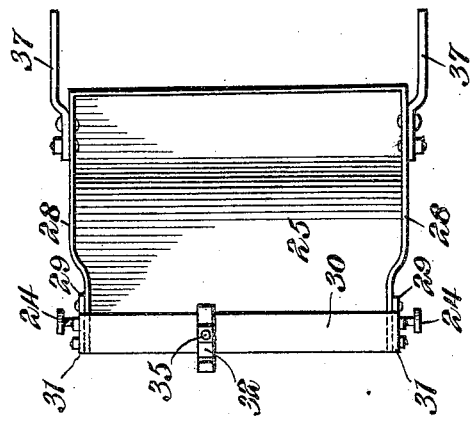
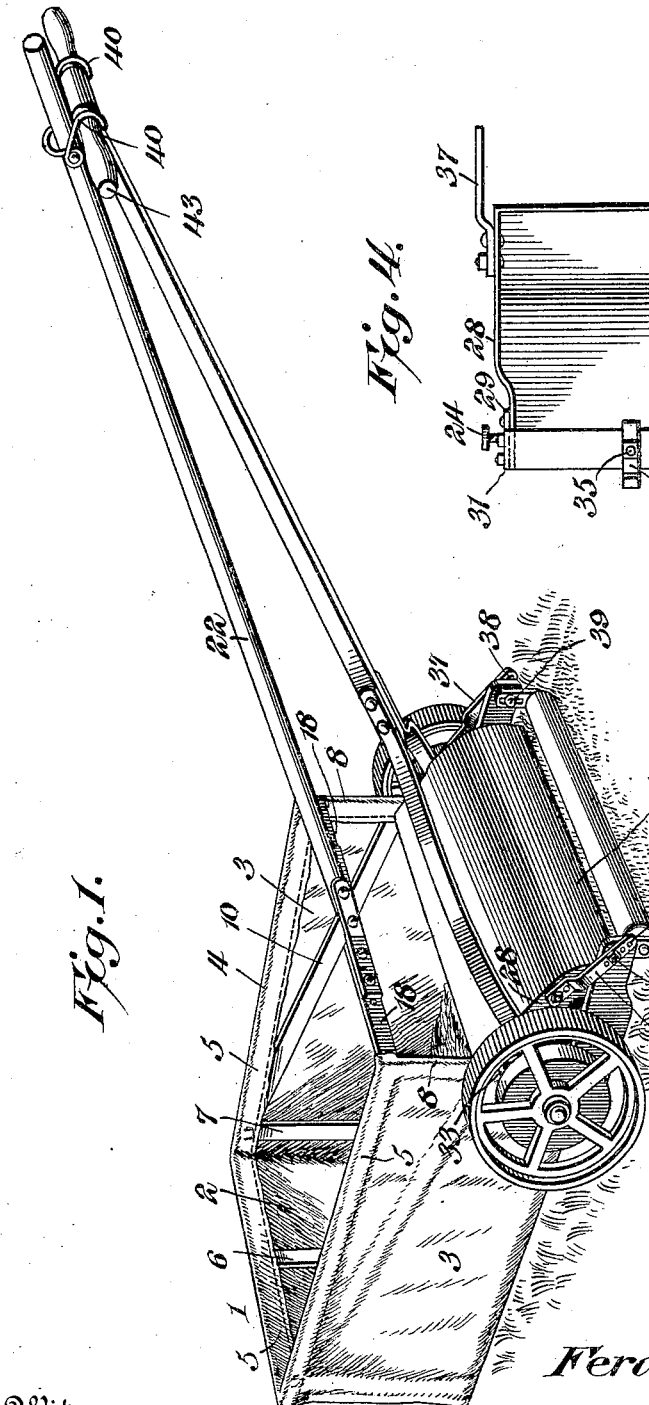
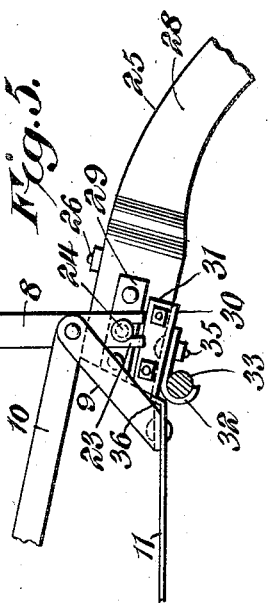
Ferd Roush, Inventor,
Witnesses
Howard D. Orr.
J. H. Riley
By E. G. Siggers
Attorney F. ROUSH.
GRASS CATCHER FOR LAWN MOWERS.
APPLICATION FILED SEPT. 23, 1907.
934,361.
Patented Sept. 14, 1909.
2 SHEETS—SHEET 2.
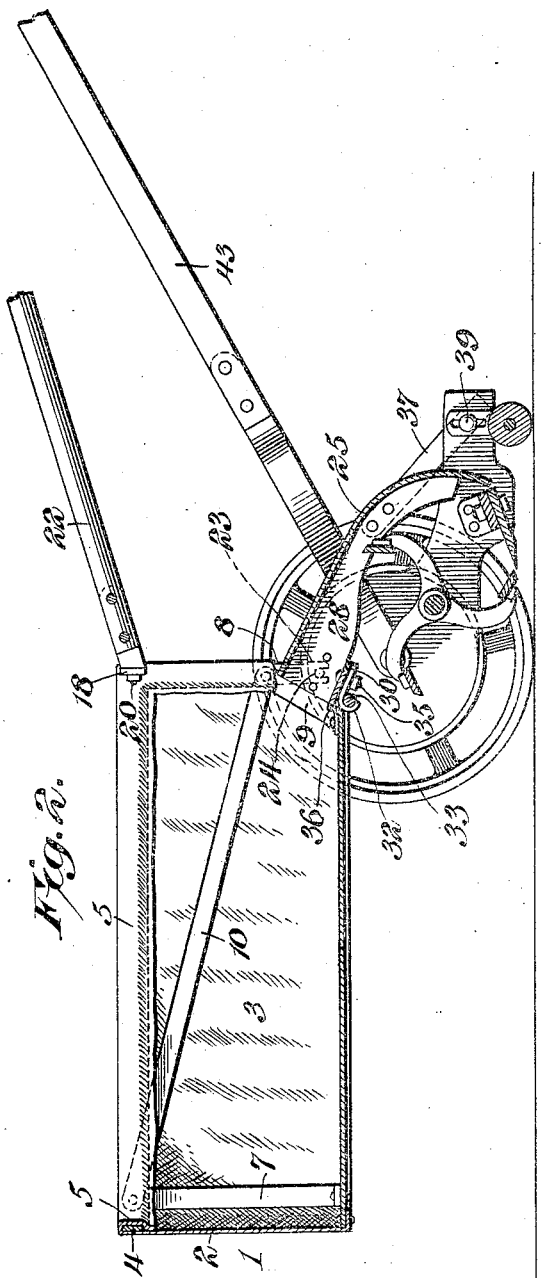
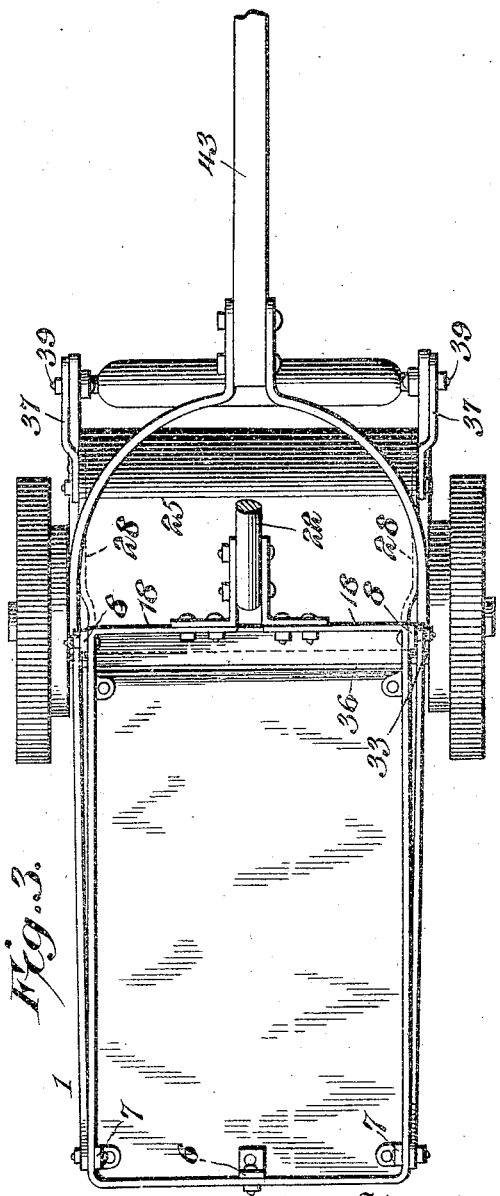
Witnesses
Howard D. Orr.
H. J. Riley
Ferd Roush Inventor,
By E. G. Siggers
Attorney

UNITED STATES PATENT OFFICE.

FERNANDO ROUSH, OF LE MARS, IOWA, ASSIGNOR OF ONE-HALF TO GEORGE C. COUNTRYMAN, OF LE MARS, IOWA.

GRASS-CATCHER FOR LAWN-MOWERS.

934,361.      Specification of Letters Patent.    Patented Sept. 14, 1909.

Application filed September 23, 1907. Serial No. 394,249.

*To all whom it may concern:*

Be it known that I, FERNANDO ROUSH, a citizen of the United States, residing at Le Mars, in the county of Plymouth and State of Iowa, have invented a new and useful Grass-Catcher for Lawn-Mowers, of which the following is a specification.

The invention relates to improvements in grass catchers for lawn mowers.

The object of the present invention is to improve the construction of grass catchers for lawn mowers, and to provide a simple and comparatively inexpensive grass catcher, which will be light, strong and durable and adapted to be easily and quickly dumped by the operator without stooping.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a grass catcher, constructed in accordance with this invention and shown applied to a lawn mower. Fig. 2 is a longitudinal sectional view of the same. Fig. 3 is a plan view. Fig. 4 is a reverse plan view of the hood, which guides the grass into the receptacle. Fig. 5 is an enlarged detail view, illustrating the manner of mounting the device on the cross rod of a lawn mower.

Like numerals of reference designate corresponding parts in all the figures of the drawings.

The grass catcher is equipped with a receptacle 1, having a sheet metal bottom and provided with fabric end and side walls 2 and 3, preferably made of canvas and supported by a frame. The frame is provided with a substantially rectangular top member 4, composed of sides and a transverse connection portion, and arranged in hems or casings 5 of the upper edges of the fabric end and side walls. The top member of the frame is supported at the front end of the receptacle by intermediate and side vertical bars 6 and 7, riveted or otherwise secured at their upper ends to the top member of the frame, and having their lower ends bent inward horizontally and riveted to the sheet metal bottom of the receptacle. The rear end of the receptacle is open to provide a mouth or entrance, and the side walls are supported thereat by means of depending vertical bars 8 and short inclined braces 9, secured at their lower ends to the sheet metal bottom of the receptacle and connected at their upper ends to the bars 8 at points intermediate of the ends thereof. The side walls are also supported by long inclined braces 10, extending downwardly and rearwardly from the upper end of the vertical bars 7 to the upper terminals of the inclined braces 9. The receptacle is provided at its open rear end with upper transverse arms 18, preferably formed integral with the top member of the frame and suitably connected with the lower end of the inclined handles 22.

The rear vertical bars 8 depend below the upper ends of the braces 9 to form arms 23, which are forked or bifurcated at their lower ends to engage studs 24 of a hood or casing 25, adapted to be arranged over the rotary cutter of a lawn mower, as clearly illustrated in Figs. 1 and 2 of the drawings, for guiding the cut grass into the receptacle. The hood or casing extends downwardly and rearwardly from the open end of the receptacle, and its lower portion is curved and terminates adjacent to the fixed blade or cutter bar of the mower. As the hood extends upwardly from a point in rear of the fixed blade of the cutting mechanism, and then forwardly over the same between the sides of the mower, and then to the lower portion of the rear end of the receptacle and actually enters the mouth of the latter, the cut grass is guided until it is received within the receptacle. The hood or casing is provided with side walls 28, which are curved longitudinally to conform to the configuration of the hood or casing. The studs 24, which are detachably engaged by the bifurcated arms of the receptacle, are preferably mounted on plates 29, which are riveted to the outer faces of the side walls of the hood or casing. The hood or casing is also provided with a transverse bottom connecting portion 30, extending across the bottom of the hood or casing at the upper end thereof and having upwardly bent terminals 31, which are secured in the outer faces of the side walls of the hood or casing by bolts, or other suitable fastening devices. The transverse bottom bar is equipped with a hook 32 for engaging the cross bar 33 of the lawn mower. The hook is secured to the lower face of the transverse bar 30 by a bolt 35. The bill of the hook extends from the upper end of the shank and engages over the cross bar 32. The transverse bar 30 is set at a slight inclination, and its upper edge is arranged contiguous to the rear edges 36 of the bottom, the rear edge being bent upward to form flanges to prevent the escape of grass. The hood or casing is also provided at its sides with rearwardly projecting inclined arms 37, rigidly secured at their upper ends to the outer faces of the side walls of the hood or casing, and provided at their lower portions with perforations 38, arranged at intervals and adapted to receive bolts 39 for adjustably securing the rear rollers of the lawn mower to the frame thereof.

The handle of the grass catcher is equipped with a catch, having two hook-shaped sides 40, which are adapted to engage the handle 43 of the lawn mower, as clearly shown in Fig. 1 of the drawings. The catch may be readily disengaged from the handle of the lawn mower, and the receptacle may then be lifted off the laterally projecting studs of the hood or casing. This will enable the operator to empty the grass catcher without stooping. Also the particular arrangement of the hood or casing and the receptacle prevents the operation of catching the grass from being interfered with by the wind, and as the receptacle is located at the front of the mower, it does not obstruct the view of the ground immediately in rear of the mower, and it is out of the way when drawing the lawn mower backward.

What I claim is:—

1. The combination with a lawn mower, of a grass catcher including a receptacle open at the rear end and located at the front of the mower at a point above and in advance of the cutting mechanism in position to receive the cut grass, means for detachably mounting the receptacle on the mower, and a rigid handle connected with the receptacle and extending along and above the handle of the mower and arranged to permit the receptacle to be lifted off the mower and emptied by the operator without stooping.

2. A grass catcher for lawn mowers comprising a receptacle, means for detachably mounting the receptacle at the front of a mower at a point above and in advance of the cutting mechanism in position to receive the cut grass, and a handle connected with the receptacle and located above and extending along the handle of the mower and provided with a catch detachably securing the handle of the receptacle to the mower handle.

3. A grass catcher for lawn mowers comprising a receptacle, means for detachably mounting the receptacle on a mower in position to receive the cut grass, and a handle connected with the receptacle and extending along the handle of the mower, and provided with a catch including two hook-shaped sides arranged to detachably engage the handle of the mower.

4. The combination with a lawn mower having a handle, of a grass catcher for lawn mowers comprising a hood provided with means for mounting it on the lawn mower over the cutting mechanism thereof and having projecting studs, a receptacle open at one end and provided thereat with bifurcated arms engaging the said studs, and a handle extending from the receptacle to the handle of the lawn mower.

5. A grass attachment for lawn mowers comprising a hood designed to be arranged at an inclination over the cutting mechanism of a lawn mower and provided with a hook for engaging the cross bar of the lawn mower, means for securing the lower portion of the hood to the lawn mower, and a receptacle having an open end mounted in front of the hood at the upper end thereof.

6. A grass catcher for lawn mowers comprising a hood adapted to be arranged at an inclination over the cutting mechanism of the lawn mower and provided with side walls, means carried by the hood for engaging the cross bar of the lawn mower, means for connecting the lower portion of the hood with the lawn mower, and a receptacle supported in front of the hood in position to receive the cut grass.

7. A grass catcher for lawn mowers comprising a hood designed to be mounted over the cutting mechanism of a lawn mower and provided with means for engaging the cross bar of the lawn mower, and having arms extending from one end of it and arranged to be secured to the sides of the lawn mower, and a receptacle mounted in front of the hood and arranged to receive the cut grass.

8. A grass catcher for lawn mowers comprising an inclined hood adapted to be arranged over the cutting mechanism of a lawn mower and provided with means for engaging the same and having arms at its lower end for attachment to the sides of the lawn mower, a receptacle detachably mounted at the upper end of the hood, a handle extending from the receptacle, and means for connecting the handle with the handle of the lawn mower.

9. The combination with a lawn mower, of a receptacle open at the rear end and detachably mounted at the front of the lawn mower at a point above and in advance of the cutting mechanism, a hood extending upwardly from a point in rear of the fixed blade of the cutting mechanism and forwardly over the same between the sides of the mower to the lower portion of the rear end of the receptacle, and a handle extending rearwardly from and rigidly connected with the receptacle and located above and detachably connected with the handle of the lawn mower.

10. The combination with a lawn mower, of a grass catcher including a receptacle detachably mounted at the front of the lawn mower at a point above and in advance of the cutting mechanism, a handle rigidly connected with the receptacle for removing the latter from the lawn mower, and a hood arranged over the cutting mechanism and extending from a point in rear of the latter to the receptacle.

11. The combination with a lawn mower, of a grass catcher including a receptacle detachably mounted at the front of the mower and arranged at a point above and in advance of the cutting mechanism, said receptacle being open at the rear end, a handle rigidly connected with the receptacle for removing the latter from the lawn mower, and a hood extending over the cutting mechanism from a point in rear of the fixed blade of the same to the receptacle.

FERD. ROUSH.

Witnesses:
NELSON MILLER,
J. T. KEENAN.